US012046171B2

(12) United States Patent
Lee et al.

(10) Patent No.: US 12,046,171 B2
(45) Date of Patent: Jul. 23, 2024

(54) ELECTRONIC DISPLAY BOARD SYSTEM WITH MODIFIED ETHERNET NETWORK FOR A PLURALITY OF DISPLAY UNITS

(71) Applicant: ASONE CO., LTD., Seoul (KR)

(72) Inventors: Jeong Jae Lee, Gwangju-si (KR); Jeong Yong Lee, Seoul (KR)

(73) Assignee: ASONE CO., LTD., Seoul (KR)

( * ) Notice: Subject to any disclaimer, the term of this patent is extended or adjusted under 35 U.S.C. 154(b) by 0 days.

(21) Appl. No.: 17/635,362

(22) PCT Filed: Oct. 20, 2020

(86) PCT No.: PCT/KR2020/014346
§ 371 (c)(1),
(2) Date: Feb. 14, 2022

(87) PCT Pub. No.: WO2021/085918
PCT Pub. Date: May 6, 2021

(65) Prior Publication Data
US 2022/0277679 A1    Sep. 1, 2022

(30) Foreign Application Priority Data
Oct. 31, 2019    (KR) .................. 10-2019-0138099

(51) Int. Cl.
*G09G 3/14*    (2006.01)
*G06F 3/14*    (2006.01)
*G09F 9/33*    (2006.01)

(52) U.S. Cl.
CPC ............. *G09G 3/14* (2013.01); *G06F 3/1446* (2013.01); *G09F 9/33* (2013.01); *G09G 2300/026* (2013.01); *G09G 2370/02* (2013.01)

(58) Field of Classification Search
CPC ............ G06F 3/1446; G09G 2300/026; G09G 2300/0842; G09G 5/00; G09G 2320/00; G09G 2340/00; H10K 59/18
See application file for complete search history.

(56) References Cited

U.S. PATENT DOCUMENTS

2002/0163513 A1*  11/2002  Tsuji ..................... G09G 3/20
                                                              345/204
2005/0134526 A1*   6/2005  Willem ................ G06F 3/1446
                                                              345/1.3

(Continued)

FOREIGN PATENT DOCUMENTS

JP          6080488 B2      2/2017
JP       2017-207580 A     11/2017
(Continued)

OTHER PUBLICATIONS

International Search Report for PCT/KR2020/014346 mailed Jan. 29, 2021 from Korean Intellectual Property Office.

*Primary Examiner* — Matthew A Eason
*Assistant Examiner* — Sujit Shah
(74) *Attorney, Agent, or Firm* — Revolution IP, PLLC (57) ABSTRACT

The electronic display board system with a modified Ethernet network according to the present invention comprises a main controller 1 provided with a main Ethernet switch 10 comprising a first main port 101 and a second main port 102; and first to Nth display units $D_1, D_2, \ldots, D_N$ (N is an integer of 2 or more) sequentially connected with each other by an Ethernet network to receive image data transmitted from the main controller 1 to output the data on a display module 21 or transmit the data to a neighboring display unit or the main controller 1, wherein the first to Nth display units $D_1, D_2, \ldots, D_N$ each comprise a first sub-port 201 and a second sub-port 202 to receive a first image data transmitted from the second main port 102 to transmit the data in a forward (Continued)

direction and to receive a second image data transmitted from the first main port 101 to transmit the data in a reverse direction.

3 Claims, 5 Drawing Sheets

(56) References Cited

U.S. PATENT DOCUMENTS

| | | | | |
|---|---|---|---|---|
| 2006/0092967 | A1* | 5/2006 | Bergeron | H04L 12/2801 |
| | | | | 370/282 |
| 2011/0148742 | A1 | 6/2011 | Perkins et al. | |
| 2012/0319926 | A1* | 12/2012 | Koebrich | G09G 3/14 |
| | | | | 345/1.3 |
| 2015/0215105 | A1* | 7/2015 | Velitheri | H04L 5/14 |
| | | | | 370/276 |
| 2015/0286273 | A1* | 10/2015 | Tazebay | H04L 12/12 |
| | | | | 713/323 |
| 2016/0019834 | A1* | 1/2016 | Hall | G09G 3/32 |
| | | | | 345/212 |
| 2018/0165051 | A1* | 6/2018 | Kim | G09G 5/006 |
| 2018/0321893 | A1 | 11/2018 | Terao | |
| 2019/0377535 | A1* | 12/2019 | Rycyna | H04L 12/28 |
| 2020/0126514 | A1* | 4/2020 | Kim | G09G 5/14 |

FOREIGN PATENT DOCUMENTS

| | | |
|---|---|---|
| KR | 10-1028529 B1 | 4/2011 |
| KR | 10-1548351 B1 | 8/2015 |
| KR | 10-1898172 B1 | 9/2018 |

\* cited by examiner

ELECTRONIC DISPLAY BOARD SYSTEM WITH MODIFIED ETHERNET NETWORK FOR A PLURALITY OF DISPLAY UNITS

CROSS REFERENCE TO PRIOR APPLICATIONS

This application is a National Stage Application of PCT International Patent Application No. PCT/KR2020/014346 filed on Oct. 20, 2020, under 35 U.S.C. § 371, which claims priority to Korean Patent Application No. 10-2019-0138099 filed on Oct. 31, 2019, which are all hereby incorporated by reference in their entirety.

TECHNICAL FIELD

The present invention relates to an electronic display board system. More specifically, the present invention relates to an electronic display board system having a plurality of display units connected by a modified Ethernet network to transmit data.

BACKGROUND ART

In general, large-sized electronic display boards installed in places such as auditoriums, gyms, churches, etc., are implemented by connecting a plurality of display units with each other as a mosaic because it is impossible to manufacture the board in a single large panel or it incurs high costs. For connecting a plurality of display units with each other to form such a large-sized electronic display board, there are ways of connecting the display units in series or in parallel.

The way of simply connecting many display units in series has a disadvantage that if a display unit is broken, other display units that are not broken cannot be used. In order to overcome the disadvantage, Korean Patent No. 10-1028529 discloses an error processing system of an electronic display board which connects many electronic display boards in parallel to restore only LED modules with detected defects.

Korean Patent No. 10-1898172 discloses an electronic display board system configured to connect a main controller for controlling the overall electronic display board system with each of display units in series, with two image signal streams which are transmitted by two circuits, respectively. This way of transmission has a disadvantage of increasing circuits to transmit data.

Korean Patent No. 10-1548351 discloses an electronic display board system configured to connect a main control device and local control devices in series by an optical cable or a coaxial cable capable of multiplex transmission. Here, various signals are divided based on time at a high rate for data transmission, but multiple low voltage differential signaling (LVDS) or serial digital interface (SDI) is to be applied for signal transmission, which requires considerable costs for implementation.

In order to solve the above-mentioned problems, the present inventors suggest an electronic display board system which connects a main controller and each of display units which form the electronic display board by an Ethernet network using a cascading method.

DISCLOSURE OF INVENTION

Technical Problem

It is an object of the present invention to provide an electronic display board system allowing a main controller and sub-controllers included in a plurality of display units to transmit data using a modified Ethernet network.

It is another object of the present invention to provide an electronic display board system capable of outputting an image on an electronic display board normally even if a problem occurs in a circuit.

The objects above and other objects inferred therein can be easily achieved by the present invention explained below.

Solution to Problem

The electronic display board system with a modified Ethernet network according to the present invention comprises a main controller 1 provided with a main Ethernet switch 10 comprising a first main port 101 and a second main port 102; and first to Nth display units $D_1, D_2, \ldots, D_N$ (N is an integer of 2 or more) sequentially connected with each other by an Ethernet network to receive image data transmitted from the main controller 1 to output the data on a display module 21 or transmit the data to a neighboring display unit or the main controller 1, wherein the first to Nth display units $D_1, D_2, \ldots, D_N$ each comprise a first sub-port 201 and a second sub-port 202, the first sub-port 201 receives a first image data transmitted from the second main port 102 to transmit the data in a forward direction, and the second sub-port 202 receives a second image data transmitted from the first main port 101 to transmit the data in a reverse direction.

In the present invention, the first main port 101 may be connected with the second sub-port 202 of the first display unit $D_1$ by a second main circuit $MC_2$, and the second main port 102 may be connected with the first sub-port 201 of the Nth display unit $D_N$ by a first main circuit $MC_1$.

In the present invention, preferably, the first to Nth display units $D_1, D_2, \ldots, D_N$ are sequentially connected by first to N−1th sub-circuits $SC_1, SC_2, \ldots, SC_{N-1}$, respectively.

In the present invention, preferably, the first and second main circuits $MC_1$, $MC_2$ and the first to N−1th sub-circuits $SC_1, SC_2, \ldots, SC_{N-1}$ are all UTP cables.

The method of displaying an image of an electronic display board system with a modified Ethernet network according to the present invention comprises the steps of setting a predetermined transmission rate (S11); setting bi-directional transmission in a full-duplex mode (S12); when the transmission rate of a circuit changes or when data transmission in the full-duplex mode is interrupted, undergoing step S11 again to set the transmission rate and mode (S13); confirming whether an abnormality occurs in the connection state of a circuit (S14); when no abnormality information is confirmed in the connection state of the circuit, outputting the image on a display module (S15); when abnormality information is confirmed in the connection state of the circuit, determining whether a number of occurrences exceeds a predetermined number of occurrences (S16); and when the number of occurrences exceeds the predetermined number of occurrences, transmitting the abnormality information to a main controller 1 for the main controller 1 to control to output a first image data and a second image data on corresponding display units (S17).

Advantageous Effects of Invention

The present invention can configure an electronic display board system allowing a main controller and sub-controllers included in a plurality of display units to transmit data using a modified Ethernet network, thereby lowering installation costs. Also, the present invention can output an image on an electronic display board normally even if a problem occurs in a circuit for transmitting data in the electronic display board system. The present invention uses a modified Ethernet network, thereby implementing the system with lower costs, and although the present invention uses an Ethernet communication circuit, it can specify the circuit in image transmission by applying an independent protocol without following typical Ethernet communication protocols or TCP/IP protocols.

Hereinafter, the present invention will be described in detail with reference to the accompanying drawings.

MODE FOR THE INVENTION

Figure 1:
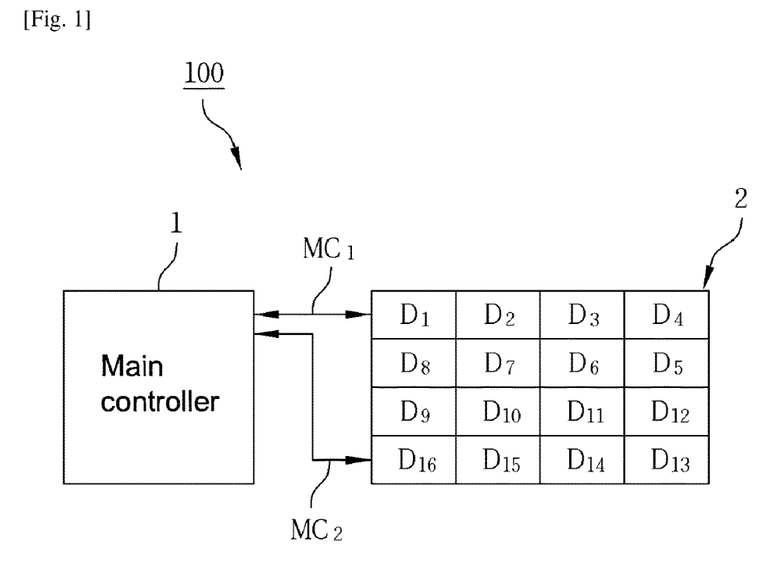
FIG. 1 is a schematic block diagram illustrating the electronic display board system according to the present invention.

FIG. 1 is a schematic block diagram illustrating an electronic display board system 100 according to the present invention. As illustrated in FIG. 1, the electronic display board system 100 according to the present invention comprises a main controller 1 and a display 2.

The main controller 1 controls to output an image received from outside on the display 2. The display 2 includes a plurality of display units $D_1, D_2, \ldots, D_N$. FIG. 1 illustrates 16 display units ($D_1$ to $D_{16}$) as an example. The display units are sequentially connected with each other by an Ethernet network. The main controller 1 and the display 2 are also connected by an Ethernet network. The main controller 1 and the first display unit $D_1$ are connected by a first main circuit $MC_1$, and the main controller 1 and the last display unit $D_N$, sixteenth display unit $D_{16}$ in FIG. 1, are connected by a second main circuit $MC_2$. Preferably, the first and second main circuits $MC_1$, $MC_2$ are all unshielded twisted pair (UTP) cables. The detailed matters on the constitution of the main controller 1 and the display 2 and the connection relation therebetween will be described below.

Figure 2:
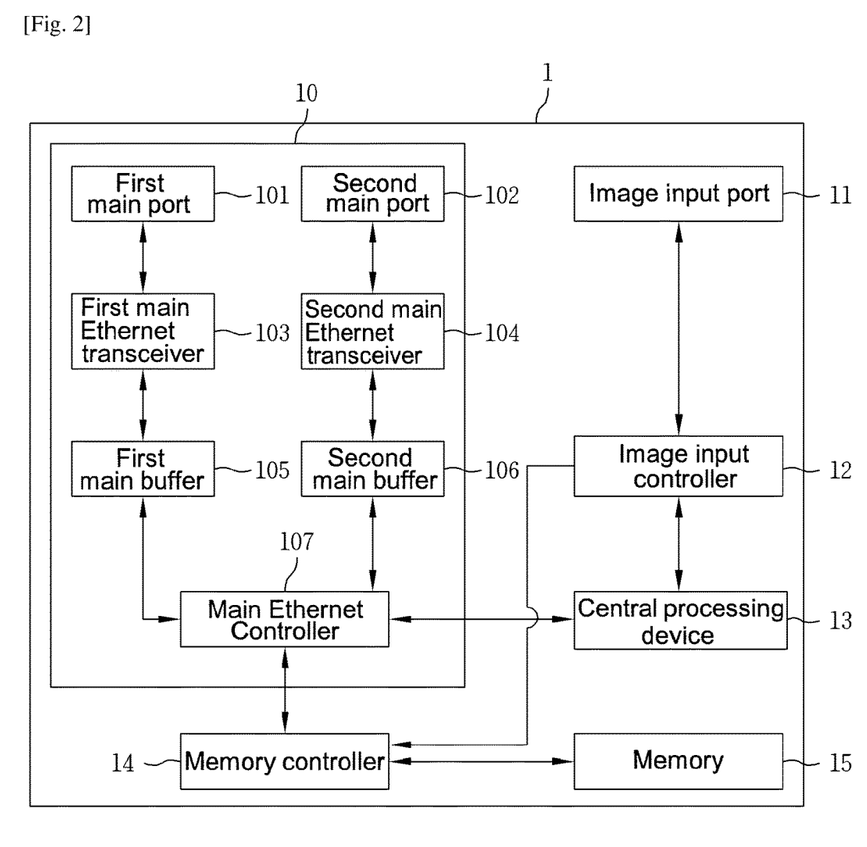
FIG. 2 is a block diagram illustrating the main controller of the electronic display board system according to the present invention.

FIG. 2 is a block diagram illustrating the main controller 1 of the electronic display board system 100 according to the present invention. With reference to FIG. 2, the main controller 1 of the present invention includes an Ethernet switch 10, an image input port 11, an image input controller 12, a central processing device 13, a memory controller 14 and a memory 15.

The Ethernet switch 10 comprises a first main port 101 and a second main port 102 for connection with the display 2. The first display unit $D_1$ of the display 2 is connected with the second main port 102 of the main controller 1 by a first main circuit $MC_1$, and the Nth display unit $D_N$ is connected with the first main port 101 of the main controller 1 by a second main circuit $MC_2$. The first and second main circuits $MC_1$, $MC_2$ support bi-directional full-duplex data transmission.

The image input port 11, a port receiving, from outside, image data to be output on the display 2, may preferably be HDMI or DVI. The image input controller 12 controls to store in the memory 15 image data input from the image input port 11 which is converted to a data format for transmission according to the instructions of the central processing device 13 along with information data necessary for data transmission or image output, determination on circuit abnormality, etc. The memory controller 14 controls to transmit the image and information data stored in the memory 15 to the display 2 through the first and second main ports 101, 102 of the Ethernet switch 10.

The first and second main ports 101, 102 of the Ethernet switch 10 of the main controller 1 of the present invention support bi-directional data transmission in the full-duplex mode. Thus, the data transmitted to the first main port 101 or the second main port 102 can be stored in the memory 15 through the memory controller 14, and the memory controller 14 can process information data adding necessary information to the received data to retransmit the data according to the central processing device 13.

The first main port 101 of the main Ethernet switch 10 is sequentially connected with a first main Ethernet transceiver 103 and a first main buffer 105, and the second main port 102 is sequentially connected with a second main Ethernet transceiver 104 and a second main buffer 106. A main Ethernet controller 107 is connected with each of the first main buffer 105 and the second main buffer 106. The main Ethernet controller 107 transmits the image and information data to be transmitted through the memory controller 14 to outside through the first main port 101 or the second main port 102 according to the instructions of the central processing device 13. The image and information data to be transmitted to outside through the first main port 101 is temporarily stored in the first main buffer 105 and transmitted through the first main port 101 by the first main Ethernet transceiver 103. Likewise, the image and information data to be transmitted through the second main port 102 is temporarily stored in the second main buffer 106 and transmitted through the second main port 102 by the second main Ethernet transceiver 104.

The main Ethernet controller 107 stores the image and information data received through the first main port 101 or the second main port 102 in the memory 15 by the memory controller 14 or transmits the data to outside again through the second main port 102 or the first main port 101. The image and information data received from outside through the first main port 101 is temporarily stored in the first main buffer 105 by the first main Ethernet transceiver 103 and processed, and the image and information data received through the second main port 102 is temporarily stored in the second main buffer 106 by the second main Ethernet transceiver 104 to be stored or re-processed for transmission.

Figure 3:
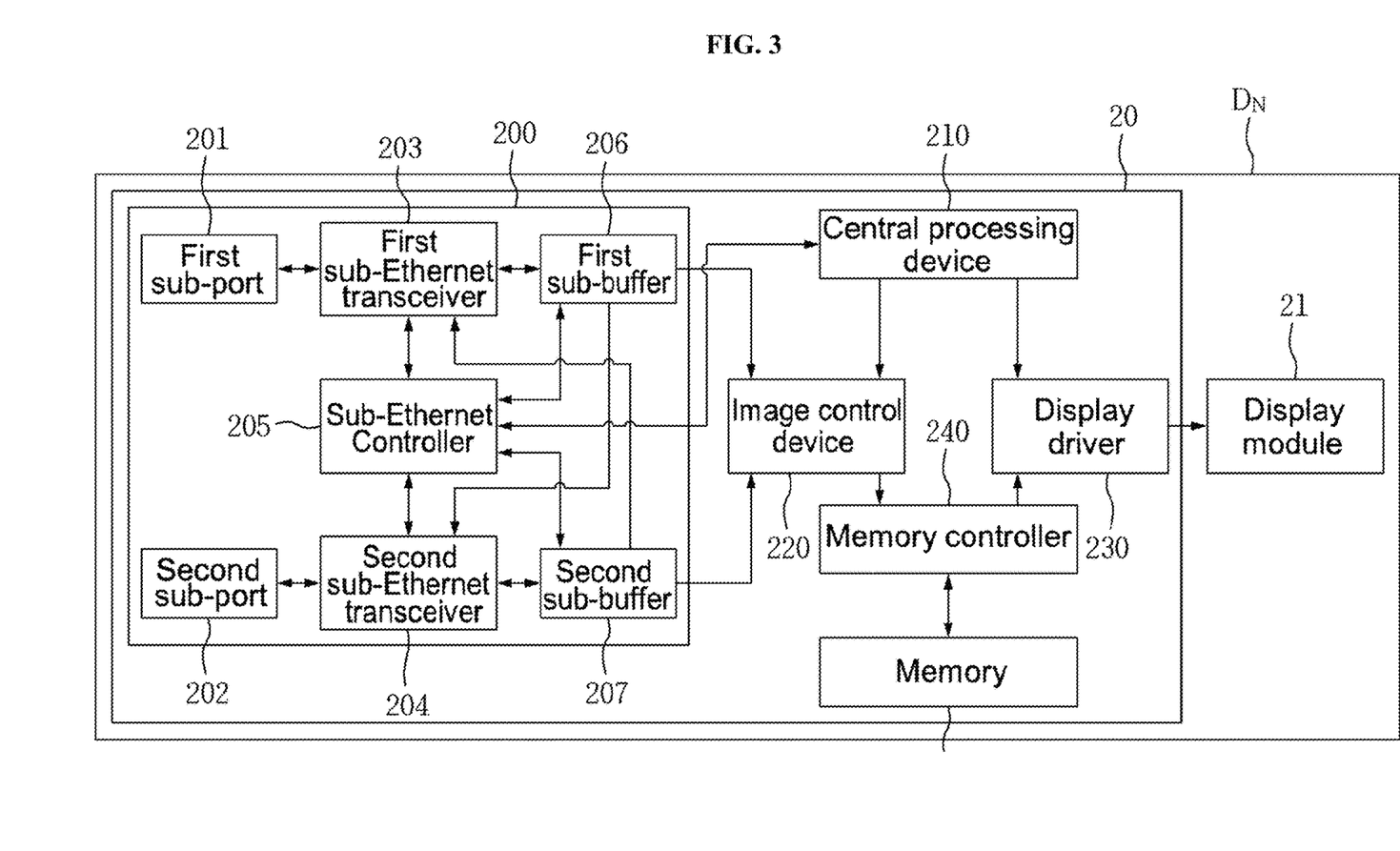
FIG. 3 is a block diagram illustrating the constitution of the display unit of the electronic display board system according to the present invention.

FIG. 3 is a block diagram illustrating the constitution of the display unit $D_N$ of the display 2 of the electronic display board system 100 according to the present invention. As illustrated in FIG. 3, each display unit $D_N$ of the plurality of display units has the same constitution, and each display unit $D_N$ comprises a sub-controller 20 and a display module 21.

The sub-controller 20 comprises an Ethernet switch 200 comprising a first sub-port 201 and a second sub-port 202 for an Ethernet network, a central processing device 210, an image control device 220, a display driver 230, a memory controller 240 and a memory 250. The display module 21 is driven by the display driver 230, and outputs image data on the display screen. Preferably, the display module is an LED module, and may be other displays such as OLED, LCD, etc., than LED.

The image data transmitted to the first sub-port 201 of the display unit $D_N$ is temporarily stored in a first sub-buffer 206 through a first sub-Ethernet transceiver 203. The image data transmitted to the second sub-port 202 is temporarily stored in a second sub-buffer 207 through a second sub-Ethernet transceiver 204. A sub-Ethernet controller 205 controls to transmit the image data to be output on the corresponding display unit $D_N$ among the received image data to the image control device 220 and store the data in the memory 250 through the memory controller 240 according to the instructions of the central processing device 210. The stored image data is recalled by the display driver 230 to be output on the display module 21. The image data that does not need to be output on the corresponding display unit $D_N$ is transmitted to outside through the first sub-port 201 or the second sub-port 202.

The Ethernet switch 200 for data transmission of the display unit $D_N$ is operated by the sub-Ethernet controller 205 according to the instructions of the central processing device 210. The sub-Ethernet controller 205 controls to temporarily store the image data received through the first sub-port 201 in the first sub-buffer 206 through the first sub-Ethernet transceiver 203. The sub-Ethernet controller 205 controls to store in the memory 250 the image data to be output on the display module 21 among the image data stored in the first sub-buffer 206 and transmit the other image data to outside through the second sub-port 202 by the second sub-Ethernet transceiver 204, according to the instructions of the central processing device 210. Likewise, the sub-Ethernet controller 205 controls to store in the memory 250 the image data to be output on the display module 21 among the image data received through the second sub-port 202 and transmit the other image data to outside through the first sub-port 201 by the first sub-Ethernet transceiver 203, according to the instructions of the central processing device 210.

Figure 4:
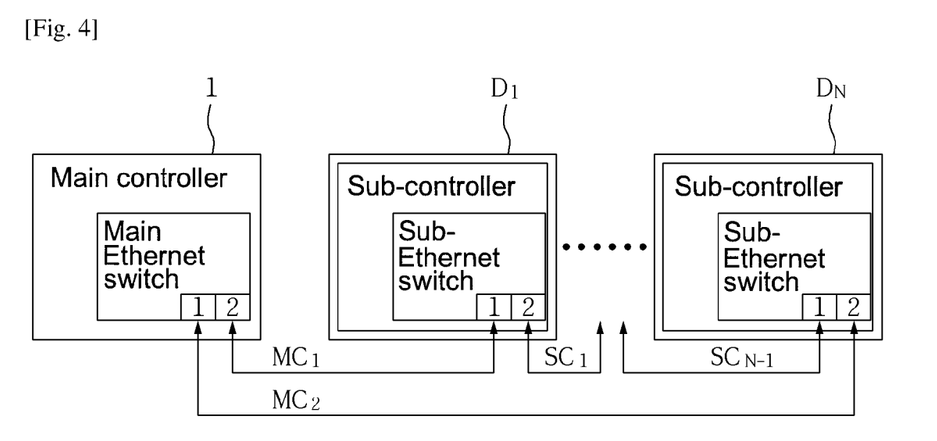
FIG. 4 is a block diagram illustrating the connection state between the main controller and the plurality of display units of the electronic display board system according to the present invention.

FIG. 4 is a block diagram illustrating the connection state between the main controller 1 and the plurality of display units $D_1, D_2, \ldots, D_N$ of the electronic display board system 100 according to the present invention. As illustrated in FIG. 4, the second main port 102 of the Ethernet switch 10 of the main controller 1 is connected with a port of the Ethernet switch of the first display unit $D_1$ by the first main circuit $MC_1$. The other port of the Ethernet switch of the first display unit $D_1$ is connected with a port of the Ethernet switch of the second display unit $D_2$ by the first sub-circuit $SC_1$. Likewise, the other port of the Ethernet switch of the second display unit $D_2$ is connected with a port of the Ethernet switch of the third display unit $D_3$ by the second sub-circuit $SC_2$. In this sequential manner, the other port of the Ethernet switch of the Nth display unit $D_N$ is connected with the first main port 101 of the Ethernet switch of the main controller 1 by the second main circuit $MC_2$. The first and second main circuits $MC_1$, $MC_2$ and the first to N−1th sub-circuits $SC_1, SC_2, \ldots, SC_{N-1}$ are all circuits capable of Ethernet communication, preferably UTP cables. Here, N is an integer of 2 or more.

Figure 5:
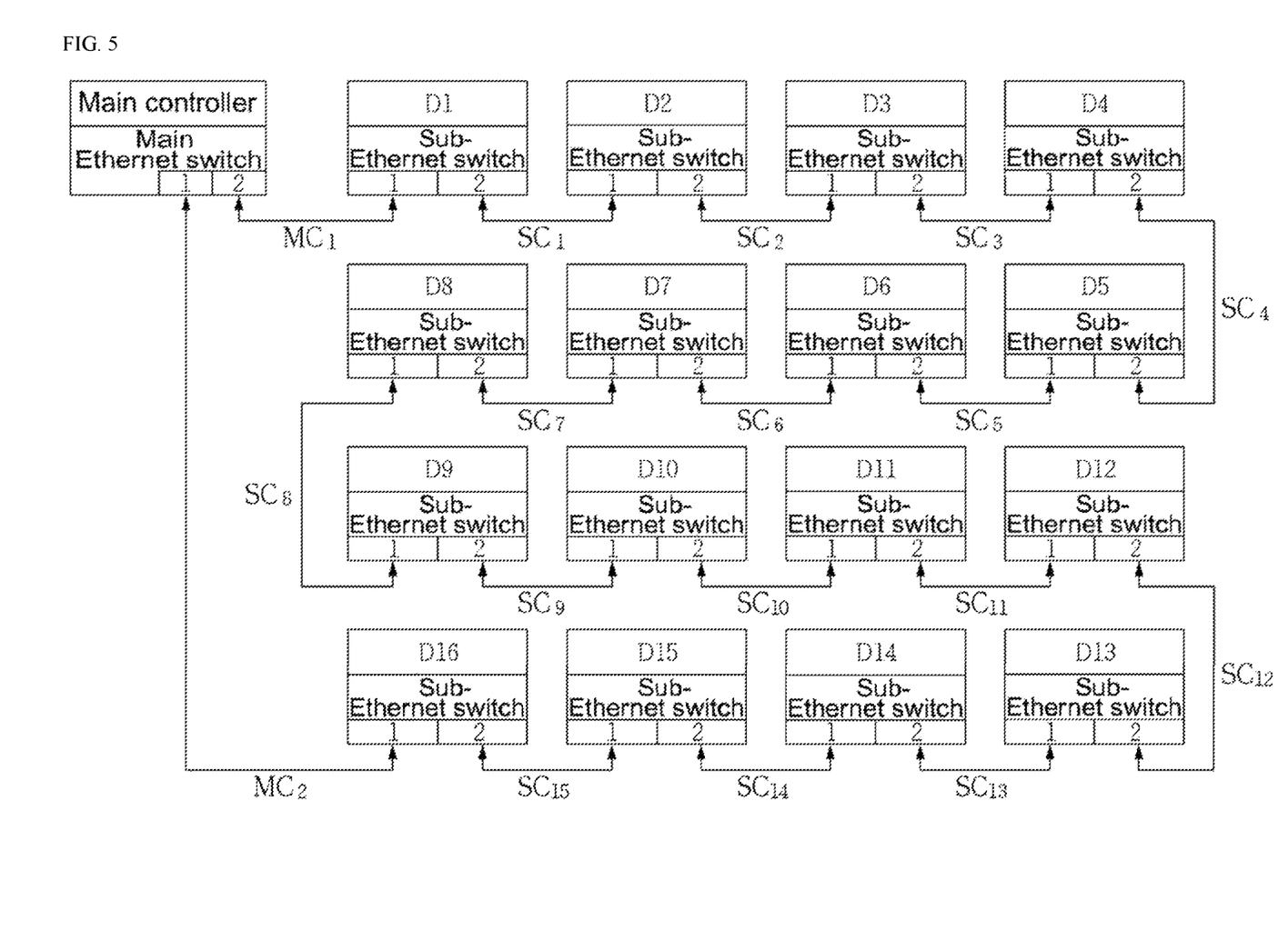
FIG. 5 is a block diagram illustrating an example of the connection state between the main controller and 16 display units of the electronic display board system according to the present invention.

FIG. 5 is a block diagram illustrating an example of the connection state between the main controller 1 and 16 display units $D_1, D_2, \ldots, D_{16}$ of the electronic display board system 100 according to the present invention. With reference to FIG. 5, a process for transmitting image data of the electronic display board system 100 of the present invention will be described as follows.

For the main circuits and sub-circuits used herein, cables capable of data transmission according to Ethernet communication protocols are used. Furthermore, bi-directional data communication in a full-duplex mode is possible with one circuit. Thus, for the first main circuit $MC_1$, the first main port 101 and the second main port 102 of the Ethernet switch 10 of the main controller 1 are an output port and also an input port. The first sub-port and the second sub-port of each of the first to sixteenth display units $D_1, D_2, \ldots, D_{16}$ are an output port and also an input port. Meanwhile, the Ethernet switch 10 of the main controller 1 is described as having two ports, but may have more ports than two ports to drive other electronic display boards simultaneously. For example, the Ethernet switch 10 may further comprise a third port and a fourth port to display an image on a plurality of display units separately.

In the present invention, the main controller 1 controls to transmit the same image data through both the first main circuit $MC_1$ and the second main circuit $MC_2$. If the image data transmitted from the second main port 102 through the first main circuit $MC_1$ is referred to as a first image data and the image data transmitted through the second main circuit $MC_2$ is referred to as a second image data, the first image data passes through the second main port 102 of the main controller 1, the first display unit $D_1$, the second display unit $D_2, \ldots$, the sixteenth display unit $D_{16}$, to be transmitted back to the first main port 101 of the main controller 1 through the second main circuit $MC_2$. If this transmission direction is referred to as forward direction, the second image data is transmitted in the reverse direction. The second image data is transmitted from the first main port 101 of the Ethernet switch 10 of the main controller 1 through the second main circuit $MC_2$ and passes through the sixteenth display unit $D_{16}$, the fifteenth display unit $D_{15}, \ldots$, the first display unit $D_1$, to be transmitted back to the second main port 102 of the main controller 1 through the first main circuit $MC_1$.

The two identical image data, first and second image data, is transmitted in order to output the image on the display module normally even when a transmission error occurs in any one of the main circuits and sub-circuits. For example, if the first image is designated as main image and the second image is designated as backup image, all the display units $D_1, D_2, \ldots, D_{16}$ output the first image on the display module and simply transmit the second image without outputting. While doing this, if an abnormality occurs in, for example, the seventh sub-circuit $SC_7$ and it is impossible to transmit the data, the information data on the error is transmitted to the main controller 1, the main controller 1 controls to output the first image data only on the first display unit $D_1$ to the seventh display unit $D_7$ and output the second image data on the eighth display unit $D_8$ to the sixteenth display unit $D_{16}$. The first image data and the second image data are synchronized with each other to be output on the display module, and thus the image can be normally output on the whole electronic display board system 100 despite the error of the seventh sub-circuit $SC_7$.

Figure 6:
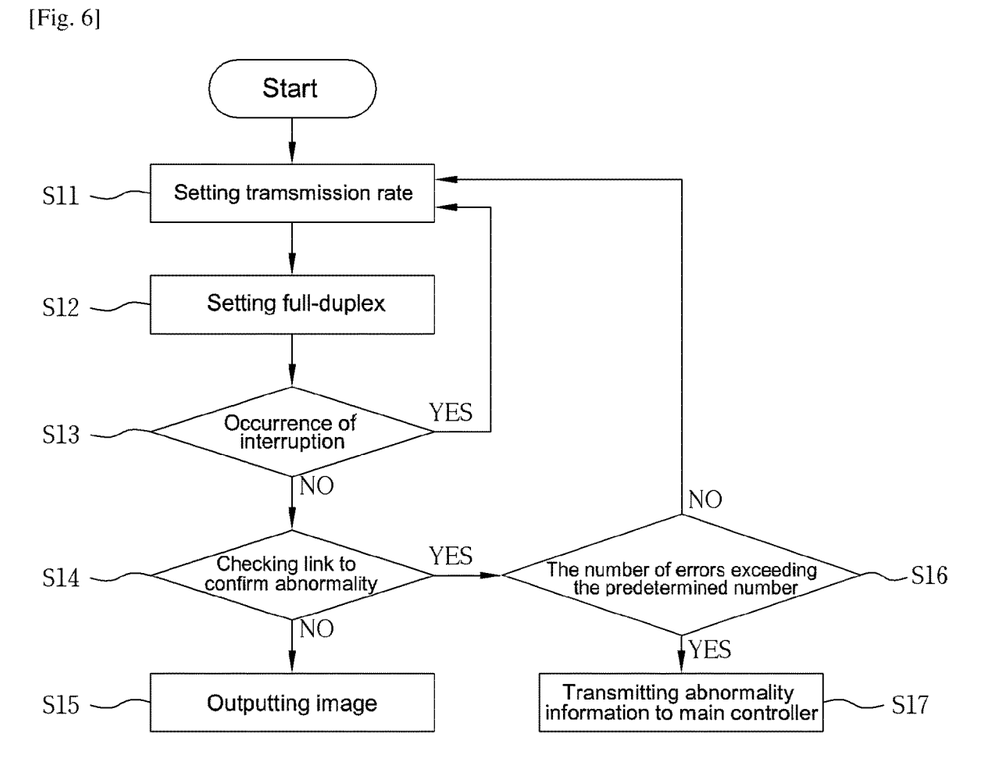
FIG. 6 is a block diagram illustrating the process for driving the electronic display board system according to the present invention.

FIG. 6 is a block diagram illustrating the process for driving the electronic display board system 100 according to the present invention. With reference to FIG. 6, first, in step S11, a transmission rate is set for the Ethernet transceiver. The transmission rate is set to a value predetermined by the main controller 1, and the sub-controllers 20 set a value identical to the value decided by the main controller 1. Typical Ethernet transceivers are set for common Internet users to support the transmission rates of 10, 100, 1000 Mbps. The present invention configures a modified Ethernet network suitable for image transmission and employs the network for data transmission. Accordingly, if the transmission rate changes, the image data may not be transmitted smoothly, which results in a problem such as low resolution. Therefore, it is necessary to set a single value for transmission rate. For example, the transmission rate is to be set at 1000 Mbps for all circuits.

Next, in step S12, all the Ethernet transceivers are set to bi-directional transmission in a full-duplex mode. The order of step S12 and step S11 may be switched.

Next, in step S13, when the transmission rate of a circuit changes or when an interruption which causes a recoverable problem for data transmission in the full-duplex mode occurs, step S11 is undergone again to set the transmission rate and mode.

Next, in step S14, whether an abnormality occurs in the connection state of a circuit is confirmed. When no abnormality information is confirmed, the image is output on a display module in step S15. When abnormality information is confirmed, step S16 is undergone to determine whether a number of occurrences exceeds a predetermined number of occurrences. For example, when an error occurs in the seventh sub-circuit $SC_7$ with the number of occurrences set at three times, step S11 is repeated until the third occurrence. When the same error occurs four times, in step S17, the abnormality information is transmitted to the main controller 1 for the main controller 1 to take a measure. The main controller 1 controls the sub-controllers 20 to receive, select and output the main image in the forward direction towards the circuits in which the error occurs and the backup image in the reverse direction, respectively.

Meanwhile, the data transmitted in the present invention is separated into image data and information data and transmitted using time division method. The image data is always transmitted first, and then the information data is transmitted sequentially following transmission of the image data. By doing so, even if an abnormality occurs in data transmission, the damage of the image data can be minimized because the image data is transmitted first.

The detailed description of the present invention described as above simply explains examples for understanding the present invention, but does not intend to limit the scope of the present invention. The scope of the present invention is defined by the accompanying claims. Additionally, it should be construed that the modifications or changes of the present invention fall within the protection scope of the present invention.

The invention claimed is:

1. An electronic display board system with a modified Ethernet network comprising:
   a main controller (1) provided with a main Ethernet switch (10) comprising a first main port (101) and a second main port (102); and
   first to Nth display units ($D_1, D_2, \ldots, D_N$) sequentially connected with each other by an Ethernet network to receive image data transmitted from the main controller (1) to output the image data on a display module (21) or transmit the image data to a neighboring display unit or the main controller (1), wherein N is an integer of 2 or more, wherein the image data includes a first image data and a second image data,
   wherein each of the first to Nth display units ($D_1, D_2, \ldots, D_N$) comprise a first sub-port (201) and a second sub-port (202), the first sub-port (201) receives the first image data transmitted from the second main port (102) to transmit the first image data in a forward direction, and the second sub-port (202) receives the second image data transmitted from the first main port (101) to transmit the second image data in a reverse direction,
   wherein each display unit includes a sub-controller (20) configured to interact with the display module (21) which is included in each display unit,
      the sub-controller (20) comprising an Ethernet switch (200), a central processing device (210), an image control device (220), a display driver (230), a memory controller (240), and a memory (250),
   wherein, in the forward direction, the first image data transmitted to the first sub-port (201) is temporarily stored in a first sub-buffer (206) through a first sub-Ethernet transceiver (203), wherein a sub-Ethernet controller (205) is configured to store the first image data in the memory (250) to be output on the display module (21) among the first image data stored in the first sub-buffer (206) and transmit the first image data which is not needed to be output on the display module (21) to outside through the second sub-port (202) by a second sub-Ethernet transceiver (204), according to instructions of the central processing device (210),
   wherein, in the reverse direction, the second image data transmitted to the second sub-port (202) is temporarily stored in a second sub-buffer (207) through a second sub-Ethernet transceiver (204), wherein the sub-Ethernet controller (205) is configured to store the second image data in the memory (250) to be output on the display module (21) among the second image data stored in the second sub-buffer (207) and transmit the second image data which is not needed to be output on the display module (21) to outside through the first sub-port (201) by the first sub-Ethernet transceiver (203), according to the instructions of the central processing device (210),
   wherein the first main port (101) is connected with the second sub-port (202) of the Nth display unit ($D_N$) by a second main circuit ($MC_2$), and the second main port (102) is connected with the first sub-port (201) of the first display unit ($D_1$) by a first main circuit ($MC_1$),
   wherein the first to Nth display units ($D_1, D_2, \ldots, D_N$) are sequentially connected by first to N−1th sub-circuits ($SC_1, SC_2, \ldots, SC_{N-1}$), respectively,
   wherein the main controller (1) transmits the first image data, which is a main image, in the forward direction where an error occurs one of the first to N−1th sub-circuits ($SC_1, SC_2, \ldots, SC_{N-1}$), wherein the display module (21) of the display unit ($D_N$) outputs the second image data, which is a backup image, in the reverse direction where the error occurs,
   wherein the first image data and the second image data are identical, synchronized with each other, and transmitted in both of the forward and reverse directions,
   wherein the first main circuit ($MC_1$), the second main circuit ($MC_2$), and the first to N−1th sub-circuits ($SC_1, SC_2, \ldots, SC_{N-1}$) enable bi-directional data communication in a full-duplex mode with one circuit,
   wherein upon one of the sub-circuits ($SC_X$) becoming unable to transmit the data due to the error, the first image data in the forward direction is output to the first to Xth display units (D$_1$~D$_X$), and the second image data in the reverse direction is output to the Nth to X+1th display units (D$_N$~D$_{X+1}$) so that each of the display units (D$_1$, D$_2$, ..., D$_N$) always outputs either the first image data or the second image data, wherein X is a natural number with 0<X<N.

2. The electronic display board system of claim 1, wherein the first and second main circuits (MC$_1$), (MC$_2$) and the first to N−1th sub-circuits (SC$_1$, SC$_2$, ..., SC$_{N-1}$) are all UTP cables,
  wherein a transmission rate is at 1000 Mbps for all circuits.

3. A method of outputting an image of an electronic display board system with a modified network, comprising the steps of:
  setting a predetermined transmission rate (S11);
  setting bi-directional transmission in a full-duplex mode (S12);
  when the transmission rate of a circuit changes or when data transmission in the full-duplex mode is interrupted, undergoing step S11 again to set the transmission rate and mode (S13);
  confirming whether an abnormality occurs in the connection state of a circuit (S14);
  when no abnormality information is confirmed in the connection state of the circuit, outputting the image on a display module (S15);
  when abnormality information is confirmed in the connection state of the circuit, determining whether a number of occurrences exceeds a predetermined number of occurrences (S16); and
  when the number of occurrences exceeds the predetermined number of occurrences, transmitting the abnormality information to a main controller (1) for the main controller (1) to control to output a first image data and a second image data on corresponding display units (S17),
  wherein the first image data and the second image data, which are same images, are synchronized and transmitted in both directions,
  wherein each of the display units receives bi-directional image data,
  wherein upon an error in the circuit, the first image date in a forward direction is output to Xth display units (D$_1$~D$_X$) and the second image data in a reverse direction is output to Nth to X+1th display units (D$_N$~D$_{X+1}$) so that each of the display units (D$_1$, D$_2$, ..., D$_N$) always outputs either the first image data or the second image data, wherein X is a natural number with 0<X<N,
  wherein each display unit includes a sub-controller (20) configured to interact with the display module (21) which is included in each display unit,
    the sub-controller (20) comprising an Ethernet switch (200), a central processing device (210), an image control device (220), a display driver (230), a memory controller (240), and a memory (250),
  wherein, in the forward direction, the first image data transmitted to the first sub-port (201) is temporarily stored in a first sub-buffer (206) through a first sub-Ethernet transceiver (203), wherein a sub-Ethernet controller (205) is configured to store the first image data in the memory (250) to be output on the display module (21) among the first image data stored in the first sub-buffer (206) and transmit the first image data which is not needed to be output on the display module (21) to outside through the second sub-port (202) by a second sub-Ethernet transceiver (204), according to instructions of the central processing device (210),
  wherein, in the reverse direction, the second image data transmitted to the second sub-port (202) is temporarily stored in a second sub-buffer (207) through a second sub-Ethernet transceiver (204), wherein the sub-Ethernet controller (205) is configured to store the second image data in the memory (250) to be output on the display module (21) among the second image data stored in the second sub-buffer (207) and transmit the second image data which is not needed to be output on the display module (21) to outside through the first sub-port (201) by the first sub-Ethernet transceiver (203), according to the instructions of the central processing device (210).

* * * * *